United States Patent
McVay et al.

(10) Patent No.: US 10,088,586 B2
(45) Date of Patent: Oct. 2, 2018

(54) DETECTION OF SINKHOLES OR ANOMALIES

(75) Inventors: Michael McVay, Gainesville, FL (US); Khiem Tat Tran, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 1188 days.

(21) Appl. No.: 13/982,009

(22) PCT Filed: Feb. 24, 2012

(86) PCT No.: PCT/US2012/026491
§ 371 (c)(1),
(2), (4) Date: Oct. 18, 2013

(87) PCT Pub. No.: WO2012/141799
PCT Pub. Date: Oct. 18, 2012

(65) Prior Publication Data
US 2014/0052379 A1 Feb. 20, 2014

Related U.S. Application Data

(60) Provisional application No. 61/446,677, filed on Feb. 25, 2011.

(51) Int. Cl.
*G01V 1/00* (2006.01)
*G01V 1/30* (2006.01)

(52) U.S. Cl.
CPC .............. *G01V 1/30* (2013.01); *G01V 1/306* (2013.01); *G01V 2210/64* (2013.01); *G01V 2210/67* (2013.01)

(58) Field of Classification Search
CPC ....... G01V 1/30; G01V 1/306; G01V 2210/64
(Continued)

(56) References Cited

U.S. PATENT DOCUMENTS

| 3,433,321 A | 3/1969 | Borges |
| 4,910,593 A | 3/1990 | Weil |

(Continued)

FOREIGN PATENT DOCUMENTS

| CA | 2726462 A1 | 2/2010 |
| CN | 101446645 A | 6/2009 |

(Continued)

OTHER PUBLICATIONS

Roberts, R., et al., "Hybrid Inversion Techniques Used To Drive Key Elastic Parameters: A Case Study From The Nile Delta," The Leading Edge, Jan. 2005, pp. 86-92, Society of Exploration Geophysicists, U.S.A.
(Continued)

*Primary Examiner* — An Do
(74) *Attorney, Agent, or Firm* — Alston & Bird LLP

(57) ABSTRACT

Systems and methods are provided for detecting subterranean properties associated with a geological domain. One example method may comprise obtaining waveform information corresponding to a geological domain. The method may further comprise performing a global inversion on the waveform information. Furthermore, the method may comprise performing a deterministic inversion on the waveform information. The method may also comprise determining one or more subterranean properties associated with the geological domain based at least in part on the global inversion and the deterministic inversion.

20 Claims, 6 Drawing Sheets

(58) Field of Classification Search
USPC .................................................. 702/2, 14, 18
See application file for complete search history.

(56) References Cited

U.S. PATENT DOCUMENTS

| | | | |
|---|---|---|---|
| 5,995,907 | A | 11/1999 | Van Bemmel et al. |
| 7,024,021 | B2 | 4/2006 | Dunn et al. |
| 7,218,267 | B1 | 5/2007 | Weil |
| 7,266,041 | B1 | 9/2007 | Padgett |
| 7,310,435 | B2 | 12/2007 | Mallya et al. |
| 7,330,791 | B2 | 2/2008 | Kim et al. |
| 7,373,251 | B2* | 5/2008 | Hamman ............... G01V 1/306 367/73 |
| 7,373,252 | B2* | 5/2008 | Sherrill .................. G01V 1/30 702/17 |
| 2005/0033518 | A1 | 2/2005 | Jenner |
| 2007/0064533 | A1 | 3/2007 | Kerr |
| 2009/0070042 | A1 | 3/2009 | Birchwood et al. |
| 2009/0120634 | A1 | 5/2009 | Liu et al. |
| 2010/0142316 | A1* | 6/2010 | Keers ...................... G01V 1/30 367/15 |
| 2011/0120724 | A1* | 5/2011 | Krohn ..................... G01V 1/30 166/369 |
| 2012/0080197 | A1* | 4/2012 | Dickens ................ G01V 3/083 166/369 |

FOREIGN PATENT DOCUMENTS

| | | |
|---|---|---|
| WO | WO 2009/117174 A1 | 9/2009 |
| WO | WO 2010/151354 A1 | 12/2010 |
| WO | WO 2010151354 A1 * 12/2010 ............. G01V 3/083 |

OTHER PUBLICATIONS

Tubic, D., et al., "Autmated Seed Detection And Three-Dimensional Reconstruction. II. Reconstruction of Permanent Prostate Implants Using Simulated Annealing," Medical Physics, 2001, pp. 2272-2279, vol. 28, No. 11, Am. Assoc. Phys. Med., U.S.A.

The International Bureao of WIPO, International Preliminary Report on Patentability for International Application No. PCT/US2012/026491, dated Aug. 27, 2013, 6 pages, Switzerland.

International Search Report and Written Opinion for Application No. PCT/US2012/026491 dated Dec. 3, 2012.

* cited by examiner

BINARY MODEL PARAMETER CODE

| | | | | | | | | |
|---|---|---|---|---|---|---|---|---|
| * | * | * | * | * | * | * | * | |

$m_{ij}$ = 0 0 0 0 0 0 0 0   $min_{ij}$
$m_{ij}$ = 0 0 0 0 0 0 0 1   $min_{ij} + 1\Delta m_{ij}$
$m_{ij}$ = 0 0 0 0 0 0 1 0   $min_{ij} + 2\Delta m_{ij}$
$m_{ij}$ = 0 0 0 0 0 0 1 1   $min_{ij} + 3\Delta m_{ij}$
.
.
$m_{ij}$ = 1 1 1 1 1 1 1 1   $max_{ij}$ $m_{ij}$ = $i^{th}$ model parameter for the $j^{th}$ event
$min_{ij}$ = minimum value of the $i^{th}$ model parameter for the $j^{th}$ event
$\Delta m_{ij}$ = resolution of the $i^{th}$ model parameter for the $j^{th}$ event

FIG. 3a

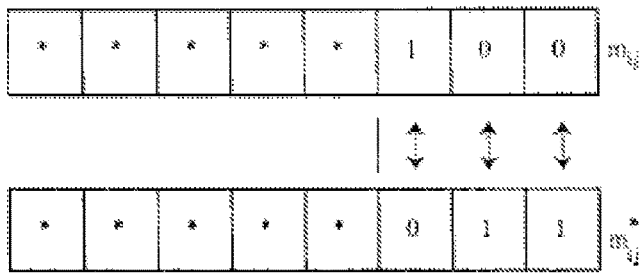

CROSSOVER

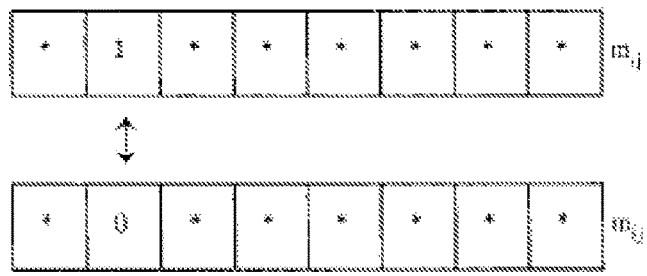

MUTATION

FIG. 3b

DETECTION OF SINKHOLES OR ANOMALIES

CROSS REFERENCE TO RELATED APPLICATIONS

This application is a national stage application, filed under 35 U.S.C. § 371, of International Application No. PCT/US2012/026491, filed Feb. 24, 2012, which claims priority to and the benefit of U.S. Provisional Application No. 61/446,677, filed Feb. 25, 2011, the contents of both of which are hereby incorporated by reference in their entirety.

BACKGROUND OF THE INVENTION

Related Field

Embodiments of the present invention relate to geographical analysis and, in particular, to detecting subterranean properties of a geological domain.

Description of Related Art

Sinkholes are a growing problem all over the United States of America, as well as in South America, Europe, and Asia. The number of claims related to sinkholes in Florida alone has recently grown from 2,360 in 2006 to 6,694 in 2010, totaling 24,671 claims throughout that period. The total cost of sinkhole claims amounted to 1.4 billion during that time. Presently, only limited technology is available for identifying sinkholes, which makes prescreening of proposed building construction sites and repairs of existing structures very difficult. Moreover, the formation and growth of a sinkhole is a dynamic process, changing sometimes drastically over time. As a result, structures that were once safe, e.g., during construction, may be at risk over time, suggesting the need for possible investigation over the life of the structure.

Sinkholes may be of varying sizes and may occur at varying depths in a substrate. The void created by the sinkhole may be filled with different materials (e.g., air, water, or soil) or a mixture of more than one material. Furthermore, the material directly above and surrounding a particular sinkhole may have any of a number of different characteristics. As a result, a significant amount of variation may exist regarding the circumstances of a particular sinkhole. Many current solutions for identifying the existence, size, and/or location of sinkholes, therefore, require initial data models of the domain and/or suffer from slow response times and a lack of precision and reliability.

Accordingly, it may be desirable to provide improved systems and methods for efficiently and effectively detecting subterranean properties of a geological domain, such as sinkholes, voids, or anomalies.

BRIEF SUMMARY

Various embodiments of the present invention include methods for detecting subterranean properties of a geological domain, such as sinkholes, voids, or anomalies, which may be a one, two, or three-dimensional region. For instance, the geological domain may be a subterranean area or volume, and the analysis may be performed aboveground without the use of boreholes or other invasive techniques. In one embodiment, the analysis of the geographical domain is a two-dimensional area extending vertically below the ground surface. Thus, embodiments of the present invention may be employed to characterize various subterranean properties associated with the geological domain based on a subsurface analysis.

According to various embodiments, the methods for detecting subterranean properties of a geological domain include collecting waveform information and analyzing the entire wave field (e.g., information related to a full seismic wave field including compression waves, shear waves, and surface waves) corresponding to a geological domain. For example, in certain embodiments, collecting waveform information may comprise subjecting a ground surface of the geological domain to one or more impacts for generating waveforms at and/or below the ground surface (e.g., by striking the ground surface with a sledge hammer or other impact mechanism) and receiving and recording (e.g., using one or more receivers, such as geophones) waveform information resulting from the one or more impacts (e.g., wave velocity and/or wave density of one or more waveforms). According to certain embodiments, a plurality of impacts (e.g., 5-10) may be applied at a plurality of respective locations along the ground surface. For example, the impacts may be applied at different locations and/or at the same location depending on the geological domain and desired frequency, and there may be a plurality of receivers (e.g., 20-30) for receiving the waveforms and recording information indicative of the waveforms.

According to various embodiments, a global inversion (e.g., a global genetic inversion) may be performed on the collected waveform information without requiring an initial model of the geological domain. For example, in some embodiments, performing the global inversion may comprise generating a first generation of models comprising one or more random models represented by one or more model parameters; determining the fitness between the observed data and the estimated data associated with each of the one or more random models; and generating a second generation of models based at least in part on the first generation. The second generation, in example embodiments, may be generated by a reproduction comprising one or more of selection, crossover, and mutation. According to some embodiments, one or more subsequent generations may be generated iteratively based at least in part on the previous generation. Performing the global inversion, in example embodiments, may comprise determining a layering geometry of the geological domain and determining material properties of the geological domain. According to certain embodiments, the entire waveform may be used during the global inversion.

According to various embodiments, a deterministic inversion (e.g., a Gauss-Newton inversion) may be performed cell by cell to locate anomalies by minimizing the error between the estimated data and the observed surface data. In this embodiment, the global inversion may be used as an input (e.g., as an initial model) of the deterministic inversion. According to example embodiments, the cell by cell properties (e.g., anomalies) are changed independently of one another to match the full waveform signals at the ground surface by minimization. In certain embodiments, the size of the cells or regions that may be changed in the deterministic inversion may be based at least in part on the size of the finite difference grid.

In an example embodiment, a method for detecting subterranean properties associated with a geological domain is provided. The method may comprise obtaining waveform information corresponding to a geological domain. Additionally, the method may comprise performing a global inversion on the waveform information. The method may further comprise performing a deterministic inversion on the waveform information. Furthermore, the method may comprise determining one or more subterranean properties associated with the geological domain based at least in part on the global inversion and the deterministic inversion.

In another embodiment, a method for detecting subterranean properties associated with a geological domain is provided. The method may comprise generating one or more impacts on the surface of the geological domain. Additionally, the method may comprise recording waveform data related to one or more seismic wave fields created by generating the one or more impacts. The method may further comprise performing a global inversion based at least in part on the waveform data. Furthermore, the method may comprise generating a globally inverted model from the global inversion to identify layering and material properties of the geological domain. The method may also comprise performing a deterministic inversion using the globally inverted model as an initial model. Furthermore, the method may comprise identifying one or more voids or anomalies in the geological domain based at least in part on an output of the deterministic inversion.

In yet another embodiment, a system for detecting subterranean properties associated with a geological domain is provided. The system may comprise at least one impact mechanism configured to generate one or more impacts on the surface of the geological domain. Additionally, the system may comprise at least one receiver configured to record waveform data related to one or more seismic wave fields created by generating the one or more impacts. The system may further comprise a processor in communication with the at least one receiver configured to perform a global inversion based at least in part on the waveform data, generate a globally inverted model from the global inversion to identify layering and material properties of the geological domain, perform a deterministic inversion using the globally inverted model as an initial model, and identify one or more voids or anomalies in the geological domain based at least in part on an output of the deterministic inversion.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE FIGURES

Reference will now be made to the accompanying drawings, which are not necessarily drawn to scale, and wherein:

FIGS. 3a and 3b illustrate parameter coding, crossover, and mutation according to example embodiments of the present invention;

DETAILED DESCRIPTION OF VARIOUS EMBODIMENTS

Figure 1:
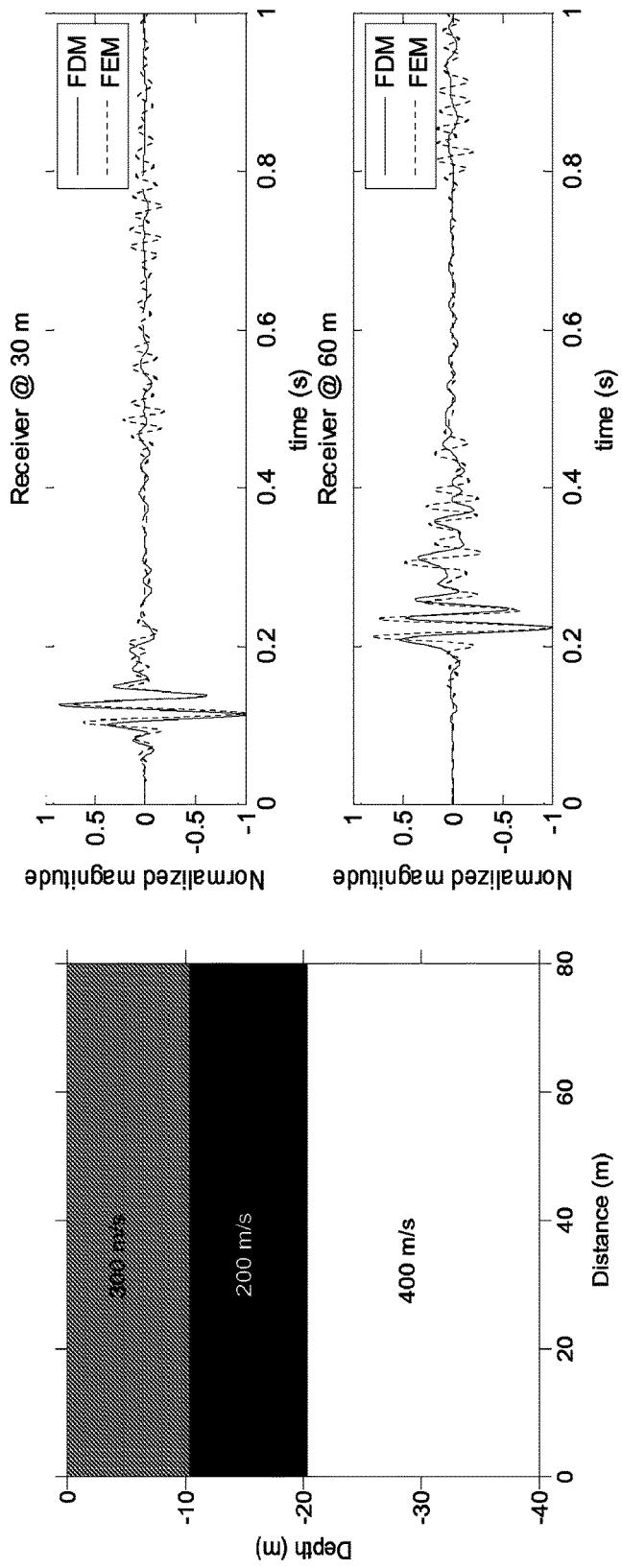
FIG. 1 illustrates a comparison between wave fields generated by a finite-difference method (FDM) and a finite element method (FEM) according to one embodiment of the present invention.

Various embodiments of the present invention will now be described more fully hereinafter with reference to the accompanying figures, in which some, but not all embodiments of the inventions are shown. Indeed, these inventions may be embodied in many different forms and should not be construed as limited to the embodiments set forth herein. Rather, these embodiments are provided so that this disclosure will satisfy applicable legal requirements. Like numbers refer to like elements throughout.

Use of the terms "geological domain," as used herein, is also not meant to be limiting and may refer to a geological region, layer, surface, or the like having specific characteristics or containing certain types of geological material. For example, a geological domain may include, but is not limited to, a subsoil region or a rock layer region.

Use of the terms "subterranean property," as used herein, is also not meant to be limiting and may refer to any property related to the material or elements located below a ground surface, such as layering, voids, boundaries, density, soil type, rock type, and/or the like.

Use of the terms "layering geometry," as used herein, is also not meant to be limiting and may refer to a geometry related to layering, voids, boundaries, and/or the like.

Use of the terms "material properties," as used herein, is also not meant to be limiting and may refer to any property associated with a material, such as densities, modulii, and/or the like. For example, material properties may refer to elastic modulus, Young's modulus, shear modulus, bulk modulus, Poisson's ratio, and/or the like.

Use of the terms "impact mechanism," as used herein, is also not meant to be limiting and may refer to any device used to provide an impact to a surface. For example, an impact mechanism may refer to a hammer, sledge hammer, drill, driver, and/or the like.

A number of different approaches are presently being used to characterize sinkholes. They range from gravity, resistivity (and conductivity), Ground Penetrating Radar (GPR) and seismic methods. Unfortunately, all of these existing methods have limitations in identifying and quantifying sinkholes. A brief discussion of these methods follows.

The gravity method measures small spatial differences in the gravitational pull of the earth. Therefore, if the gravity field over an air-filled void was to be measured, and if the void is close enough to the ground surface, then a decrease in the gravitational pull across the void could be measured and the void located. However, if the void is embedded at a depth larger than the size of the void, the measured data becomes insensitive to the void, and thus it cannot be detected. In particular, when the void is filled with water, the difference of gravity between soil and water is less than that between soil and air, and the void will become difficult to characterize.

The resistivity methods are also sometimes used to locate voids, since the air-filled void usually presents a good resistivity contrast with the host rock. However, these approaches are only suited for finding shallow voids. In the case of deeper voids, a long electrode array is needed and such an array is influenced by the large volume of rock and overburden. Thus, the effect of the void becomes relatively quite small (i.e., very difficult to detect).

Ground Penetrating Radar (GPR) has been used to locate shallow cavities. However, its depth of penetration is very dependent on the site conditions and resistivity of the ground (e.g., clay vs. sand content). GPR differentiation relies on having contrast in the dielectric properties of the target compared to the host overburden along with sufficient depth penetration to reach the target. However, penetration of the GPR signal is severely limited in saturated, electrically conductive ground containing clay. Moreover, it will not provide any credible information of material below the ground water level. Thus, a void cannot be detected if it is filled with water.

Seismic methods including reflection/refraction tomography and Rayleigh waves have also been used to locate voids. Unfortunately, the limitation of existing wave approaches is that only a small percentage of the waveform is actually used for inference, and these parts are not very sensitive to voids. For example, seismic reflection and refraction methods use only first-arrival signals to infer unknown material properties (e.g., Elastic Young's Modulus or Shear Modulus). The travel time from a source to a receiver is measured from the fastest ray that starts from the source and travels through a medium to the receiver. The fastest ray tends to go through stiffer material, and it only travels within a few meters at the top of the stiff layer (e.g., bed rock) regardless of the geophone spread. The technique fails to characterize the deeper material, and thus fails to locate the embedded void in the bed rock.

Similarly, Rayleigh wave approaches often use the dispersion property of wave fields to determine wave velocity of the subsurface. The dispersion property is developed by averaging the properties of the whole volume of material within a depth of approximately one wavelength for each frequency. Moreover, when the depth of investigation increases, lower frequency or longer wavelength components are required, resulting in larger volumes of material being utilized to derive the dispersion property. Consequently, the dispersion data becomes quite insensitive to the embedded void and its presence is difficult to discern.

An additional concern with existing seismic, non-destructive techniques (NDT) is that they require significant prior information for interpretation. For instance, most methods employ local inversion approaches (gradient methods) that are strongly dependent on the initial assumed model. In order to obtain a good inversion result, these local techniques require both a reasonable initial model and prior information about the subsurface that are not always available. The requirement of prior information makes the interpretation somewhat subjective based on the interpreter's judgment and experience.

Embodiments of the present invention relate to a new technique for inverting full wave fields passing through a geological domain using, according to various embodiments, both global and deterministic inversions. One or more subterranean properties may then be determined that are associated with the geological domain based at least in part on the global inversion and the deterministic inversion.

In some embodiments, the technique may be based on a finite-difference solution of two dimensional (2-D) elastic wave equations in the time and space domains. An advantage of various embodiments is the ability to generate all possible waveforms (e.g., shear, compression, and surface waves), which model the complex seismic wave fields associated with geometry (e.g., layering, voids, boundaries, etc.) and material (e.g., density, Elastic Modulii: Shear and Young's). In certain embodiments, the approach may employ an explicit finite-difference scheme with absorbing boundary conditions for the solution. According to various embodiments, the solution strategy may begin with performing a global genetic inversion to obtain soil layering and material properties (e.g., Modulii and densities). The genetic algorithm, which may utilize a number of unknowns (e.g., up to one hundred), is capable of capturing stiff over soft layering, gradation, as well as partial or fully saturated soil/rock conditions. In some embodiments, the layering and soil/rock properties determined by the global inversion may be used in a deterministic inversion, for example a Gauss-Newton Deterministic Inversion, which may be performed cell by cell to capture anomalies within the domain. The deterministic inversion (an iterative process) may stop when, in certain embodiments, the residual error is sufficiently small.

According to various embodiments of the present invention, to reduce the previously mentioned limitations of current seismic approaches (e.g., first arrival of reflection, refraction signals), the full seismic waveform propagation, including for example compression waves, shear waves, etc., may be modeled through the domain. This approach, according to certain embodiments, may ensure that difficult layering (e.g., stiff over soft), especially embedded anomalies (e.g., variable densities), may be captured with the full elastic wave fields from both excitation and particle measurements (e.g., via geophones) located at the ground surface. In some embodiments, in order to solve the full waveform, it may be necessary to develop and code boundary conditions of the characterized medium such as: 1) energy absorption (e.g., along the sides); and 2) reflections and excitation (e.g., along the top boundary).

In example embodiments, to obtain domain (e.g., volume) information (e.g., layering and properties of volume) from measured surface data, an inversion may be performed. Global inversion techniques such as simulated annealing, genetic algorithms, and other sampling approaches may be applied in evaluation of various geophysical data sets according to certain embodiments (e.g., first arrival data). Unlike local inversion techniques, global inversion techniques, in some embodiments, may attempt to find the global minimum of the misfit function by searching over a large parameter space.

In various embodiments, the full waveform inversion strategy may begin with the genetic global inversion for at least one of the following reasons: 1) the global inversion technique may be used in cases where the model-data relationship is highly nonlinear and produces multimodal misfit functions, and it is typically faster than simulated annealing; 2) the global inversion technique may avoid traps in local minima, since it is a stochastic process and it may use more global information to update the current position; and 3) it may be possible to converge on a unique solution without the use of existing domain data (e.g., Modulii, layering, and/or the like) from borehole data. In one aspect, the global inversion may be used in identifying soil/rock layering and mean properties (e.g., Modulii and density) of the domain.

In embodiments where the domain's geometry (e.g., layering) and material properties (e.g., density and Modulii) have been established, the algorithm may use a Gauss-Newton Deterministic Inversion strategy by changing the domain's properties cell by cell to reduce the full wave field equation's error between measured and predicted surface measurements. According to various embodiments, prior non-convergence problems (i.e., local minima issues) associated with unknown information may, therefore, be reduced or eliminated. In addition, sensitivity—for example, cell by cell (e.g., anomalies, sinkholes)—and rate of convergence benefits (e.g., large 2D domains) may also be applicable.

I. Methodology a. Forward Modeling

Finite-difference recurrence equations may be used to solve two-dimensional first-order linear partial differential equations describing elastic wave propagation. For example, in the two dimensional (2-D) case, the following two sets of equations may be solved.

Equations governing particle velocity:

$$\begin{cases} \dfrac{\partial v_x}{\partial t} = \dfrac{1}{\rho}\left(\dfrac{\partial \sigma_{xx}}{\partial x} + \dfrac{\partial \sigma_{xz}}{\partial z}\right) \\ \dfrac{\partial v_z}{\partial t} = \dfrac{1}{\rho}\left(\dfrac{\partial \sigma_{xz}}{\partial x} + \dfrac{\partial \sigma_{zz}}{\partial z}\right) \end{cases} \quad (1)$$

Equations governing stress tensor:

$$\begin{cases} \dfrac{\partial \sigma_{xx}}{\partial t} = (\lambda + 2\mu)\dfrac{\partial v_x}{\partial x} + \lambda \dfrac{\partial v_z}{\partial z} \\ \dfrac{\partial \sigma_{zz}}{\partial t} = (\lambda + 2\mu)\dfrac{\partial v_z}{\partial z} + \lambda \dfrac{\partial v_x}{\partial x} \\ \dfrac{\partial \sigma_{xz}}{\partial t} = \mu\left(\dfrac{\partial v_x}{\partial z} + \dfrac{\partial v_z}{\partial x}\right). \end{cases} \quad (2)$$

In these equations, $(v_x, v_z)$ is the particle velocity vector, $(\sigma_{xx}, \sigma_{zz}, \sigma_{xz})$ is the stress tensor, $\rho$ is the density and $\mu, \lambda$ are Lamé coefficients that represent the material's properties (i.e., Modulii), and $\rho$ is the material's density.

The derivatives may be discretized using center finite-differences thereby resulting in the following particle velocities for (1) and (2) as:

$$U_{i,j}^{k+1/2} = U_{i,j}^{k-1/2} + B_{i,j}\dfrac{\Delta t}{\Delta x}(Txx_{i+1/2,j}^{k} - Txx_{i-1/2,j}^{k}) + \quad (3)$$

$$B_{i,j}\dfrac{\Delta t}{\Delta z}(Txz_{i,j+1/2}^{k} - Txz_{i,j-1/2}^{k})$$

$$V_{i+1/2,j+1/2}^{k+1/2} = V_{i+1/2,j+1/2}^{k-1/2} + B_{i+1/2,j+1/2}\dfrac{\Delta t}{\Delta x}(Txz_{i+1,j+1/2}^{k} - Txz_{i,j+1/2}^{k}) +$$

$$B_{i+1/2,j+1/2}\dfrac{\Delta t}{\Delta z}\left(Tzz_{i+1/2,j+1}^{k} - Tzz\right)$$

$$Txx_{i+1/2,j}^{k+1} = Txx_{i+1/2,j}^{k} + (L+2M)_{i+1/2,j}\dfrac{\Delta t}{\Delta x}(U_{i+1,j}^{k+1/2} - U_{i,j}^{k+1/2}) +$$

$$L_{i+1/2,j}\dfrac{\Delta t}{\Delta z}(V_{i+1/2,j+1/2}^{k+1/2} - U_{i+1/2,j-1/2}^{k+1/2})$$

$$Tzz_{i+1/2,j}^{k+1} = Tzz_{i+1/2,j}^{k} + (L+2M)_{i+1/2,j}\dfrac{\Delta t}{\Delta z}(V_{i+1/2,j+1/2}^{k+1/2} - V_{i+1/2,j-1/2}^{k+1/2}) +$$

$$L_{i+1/2,j}\dfrac{\Delta t}{\Delta x}(U_{i+1,j}^{k+1/2} - U_{i,j}^{k+1/2})$$

$$Txz_{i,j+1/2}^{k+1} = Txz_{i,j+1/2}^{k} + M_{i,j+1/2}\dfrac{\Delta t}{\Delta z}(U_{i,j+1}^{k+1/2} - U_{i,j}^{k+1/2}) +$$

$$M_{i,j+1/2}\dfrac{\Delta t}{\Delta x}(V_{i+1/2,j+1/2}^{k+1/2} - V_{i-1/2,j+1/2}^{k+1/2})$$

In these equations, k, i, and j are the indices for time, x-axis, and z-axis discretization. $\Delta t$, $\Delta x$, and $\Delta z$ are grid steps for time, x-axis, and z-axis respectively. Numerical velocity $(U,V)=(v_x,v_z)$ at time $(k+1/2)\Delta t$, and numerical stress (Txx, Tzz, Txz)=$(\sigma_{xx}, \sigma_{zz}, \sigma_{xz})$ at time $(k+1)\Delta t$ may be computed explicitly from velocity at time $(k-1/2)\Delta t$ and stress at time $k\Delta t$. B is $1/\rho$, and M, L are Lamé coefficients $(\mu, \lambda)$.

The above equations (3) may be solved for the case of loading/excitation (e.g., a blast) within the domain. In an instance in which only a half space solution is considered, the lateral extent of the domain may be very large to avoid the problem of wave reflections (e.g., not handling boundaries that exist in nature).

To solve real world problems in an expeditious manner, according to certain embodiments of the present invention, some special boundary conditions may be developed and employed for the forwarding model to reduce the size of the medium as small as possible. The following boundary conditions may be assumed. Free-surface condition on top:

$$\begin{cases} \sigma_{xz} = 0 \\ \sigma_{zz} = 0 \end{cases} \quad (4)$$

or equivalently from equation (1) and (2):

$$\begin{cases} \dfrac{\partial v_x}{\partial z} = -\dfrac{\partial v_z}{\partial x} \\ \dfrac{\partial v_z}{\partial z} = -\dfrac{\lambda}{\lambda+2\mu}\dfrac{\partial v_x}{\partial x} \end{cases} \quad (5)$$

To reduce the size of the mesh, in some embodiments, the absorbing condition at the bottom of the domain may be assumed:

$$\begin{cases} \dfrac{\partial v_x}{\partial t} + Vs\dfrac{\partial v_x}{\partial z} = 0 \\ \dfrac{\partial v_z}{\partial t} + Vp\dfrac{\partial v_z}{\partial z} = 0 \end{cases} \quad (6)$$

and at the right hand side and left hand side:

$$\begin{cases} \dfrac{\partial v_x}{\partial t} + Vs\dfrac{\partial v_x}{\partial x} = 0 \\ \dfrac{\partial v_z}{\partial t} + Vp\dfrac{\partial v_z}{\partial x} = 0 \end{cases} \quad (7)$$

where Vs, Vp are shear and P-wave velocities.

Similarly for the ground surface, according to various embodiments, the geometry may be chosen so that the free surface is located substantially through the upper part of the staggered grid-points at z=0, that is, $\sigma_{xx}$, $\sigma_{zz}$, and $v_x$ may be located on the free surface. To update the wave field in the proximity of the free surface, in certain embodiments, both vertical velocity $v_z$ and shear stress $\sigma_{xz}$ of one row above the surface may be required. By imaging $\sigma_{xz}$ as an odd function around the free surface, according to example embodiments, it may be assured that $\sigma_{xz}$ will equal zero there. From equation (5), the $v_z$ above surface may be obtained as:

$$V_{i+1/2,1/2}^{k+1/2} = V_{i+1/2,3/2}^{k+1/2} + \dfrac{L_{i+1/2,1}}{(L+2M)_{i+1/2,1}}\dfrac{\Delta z}{\Delta x}(U_{i+1,1}^{k+1/2} - U_{i,1}^{k+1/2}) \quad (8)$$

Similarly, certain embodiments may assume that $\sigma_{xz}$ and $v_x$ are odd functions around the symmetrical line to update the wave field in the proximity of left hand side boundary. According to some embodiments, for absorbing boundary conditions (6) and (7), a backward finite-difference scheme may be used in both spatial and time directions to update velocity components $v_x$, $v_z$ at vertical gridlines 1 and 3/2 for the left hand side boundary; Nx, Nx−1/2 for the right hand side boundary; and at horizontal gridlines Nz, Nz−1/2 for the bottom boundary.

According to various embodiments, the initial conditions may be set to satisfy equilibrium at time t=0 (i.e., when stress and velocity are zero everywhere in the medium). In example embodiments, the medium (e.g., ground surface) may be perturbed by changing vertical stress $\sigma_{zz}$ at the source (e.g., with a hammer blow) and modeled as a triangle wavelet or a Ricker wavelet R(t):

$$R(t) = (1 - 2\pi^2 f_c^2 (t-t_0)^2) \cdot \exp(-\pi^2 f_c^2 (t-t_0)^2) \quad (9)$$

where $f_c$ is the center of the frequency band and $t_0$ is the time shift. For soil layering, for example, frequencies in the range of about 10 to 30 Hz may be used. For anomaly assessment (i.e., sinkholes), for example, higher frequencies (e.g., about 30 Hz to 80 Hz) may be considered.

For homogeneous media, in some embodiments, the numerical stability condition for this explicit scheme may be:

$$V_p \Delta t \sqrt{\frac{1}{\Delta x^2 + \Delta z^2}} \leq 1 \quad (10)$$

and for heterogeneous cases, the $V_p$ value in the equation (10) may be the maximum P-wave velocity in the media. $\Delta x$ and $\Delta z$ may be selected to satisfy, for example, at least ten points per minimum expected wavelength to avoid numerical dispersion. $\Delta t$ may be selected from the stability condition in some embodiments. In the inversion process, $\Delta t$ may change due to different input $V_p$ values, thus, according to example embodiments, the wave fields may be interpolated to a fixed time interval for comparing to measured wave fields.

Figure 2:
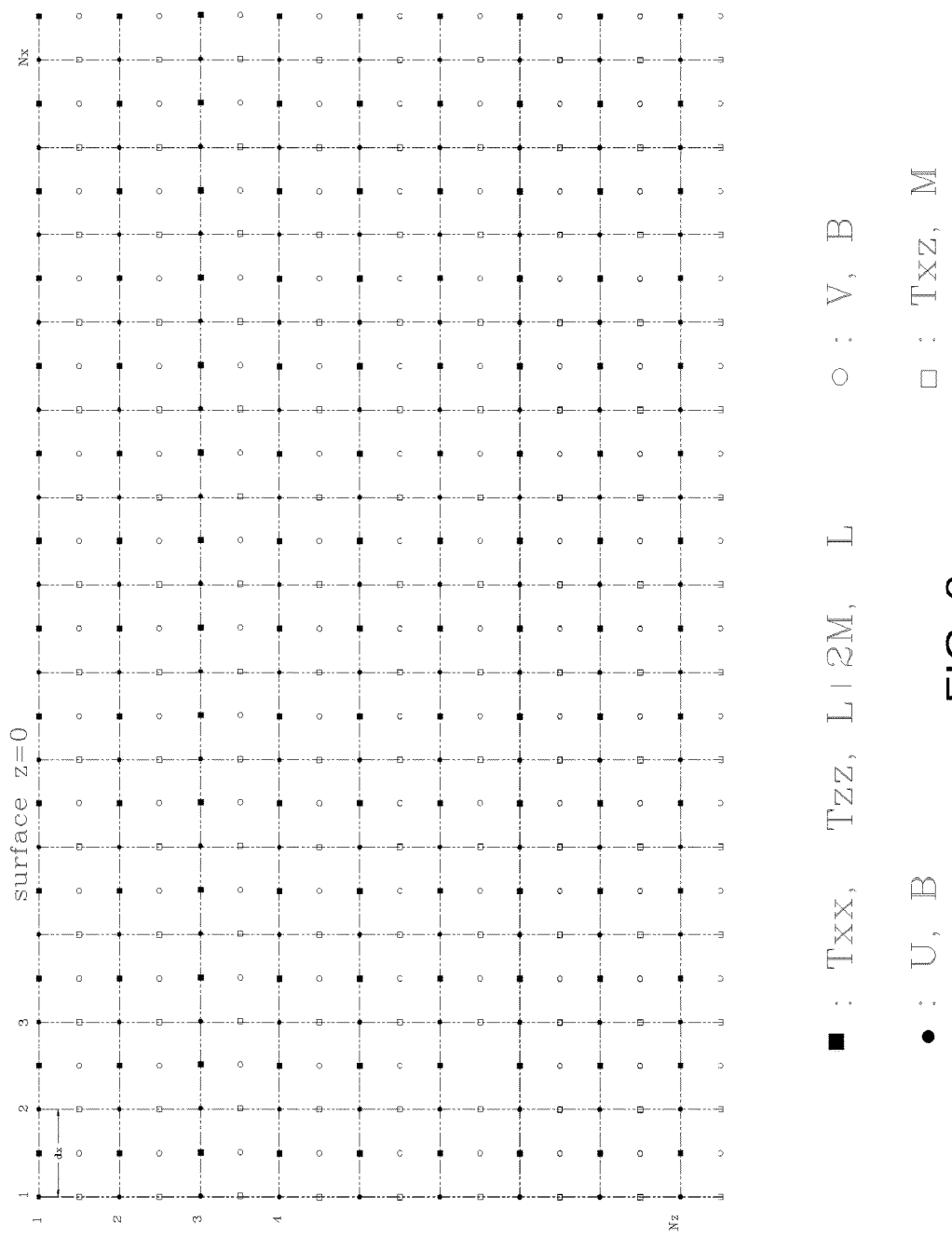
FIG. 2 illustrates a discretization of a medium on a staggered grid according to one embodiment of the present invention.

According to example analyses related to various non-limiting embodiments of the present invention, Matlab code was developed in which all stresses and particle velocities are calculated in matrix forms at each time step and then advanced along time direction. In the example analyses, the accuracy of the finite-difference method (FDM), according to various embodiments, was verified by comparing its wave field to that generated by a finite element method (FEM) available in commercial software, such as Plaxis2D. FIG. 1 illustrates that the results from the two methods are very similar. In particular, FIG. 1 illustrates an input model of the shear velocity, $V_S$, on the left and wave fields at two points (i.e., 30 m and 60 m) on the surface. By using FDM, computer time can be saved significantly. On the same standard computer, FDM may require less than one second, while FEM may require a few minutes to generate the wave field shown in FIG. 2, namely a discretization of the medium on a staggered grid. As a result, the fast finite difference solution may be applied to the global optimization method for inversion presented in the next section.

b. Global Inversion—Genetic Algorithm

According to an example embodiment, global inversion may involve maximizing a normalized correlation coefficient, E(m), which measures the fitness between observed data and estimated data associated with model m:

$$E(m) = \frac{\left| \sum_{k=1}^{N} d_k \cdot g_k(m) \right|}{\sum_{k=1}^{N} d_k^2 \cdot \sum_{k=1}^{N} g_k(m)^2}, \quad (11)$$

where $d_k$ and $g_k$ are the $k^{th}$ observed and computed responses, respectively, and N is the number of observation points, which may be equal to the number of receivers multiplied by the number of time steps. Such a correlation coefficient may vary from zero to one, and it is equal to one when a perfect matching between the observed data and estimated data is found.

Genetic algorithms may be applied in evaluation of various geophysical data sets. In certain embodiments, the algorithm may utilize a parameter coding to represent models. A binary code, including bits of 0 or 1, may be employed to represent each model parameter (FIG. 3a). For example, in an instance in which a code including nb bits: $\{a_{nb}, a_{nb-1}, a_{nb-2} \ldots a_1\}$ represents parameter $m_{ij}$, the resolution of the parameter may be determined as:

$$\Delta m_{ij} = \frac{\max_{ij} - \min_{ij}}{2^{nb} - 1}, \quad (12)$$

and the parameter value may be:

$$m_{ij} = \min_{ij} + \Delta m_{ij} \sum_{n=1}^{nb} a_n \cdot 2^{n-1} \quad (13)$$

In some embodiments, the number of bits, nb, may be selected based on the model search space between constraints and the desired resolution.

The genetic algorithm may begin with a suite of random models (e.g., the first generation may begin with a population number of Np). According to various embodiments, one or more parameters of a model in the first generation may be generated by randomly selecting a code of bits (0 and 1) and then calculating the parameter value as described in equation (13). The fitness of each model of the first generation may be determined as described in equation (11).

In example embodiments, a new generation may be generated from the current generation by reproduction (which essentially consists of three operations: selection, crossover, and mutation) and by update as follows:

1) In some embodiments, a pair of models may be selected from the current generation for reproduction. The selection process may pick models to be paired for reproduction using the processes of crossover and mutation. According to example embodiments, the probability of selection may be based on the ratio of each model's objective function to the sum of all objective functions:

$$P_s(m) = \frac{E(m)}{\sum_{A} E(m)}, \quad (14)$$

where A denotes all models in the current generation. Two different models may be selected to make a pair.

2) In example embodiments, the processes of crossover and mutation may be conducted for the selected pair in step 1. One parameter may be randomly selected for the crossover and mutation. The coded parameter selected may be subjected to the possibility of bit crossover with its mate with a specified probability $p_x$. In an instance in which crossover occurs, a cross position may be randomly selected and all the bits may be exchanged to the right of the position (FIG. 3b). According to various embodiments, a mutation may follow the crossover. The mutation may simply be the alteration of a random selected bit in the parameter code based on a specified probability $p_m$ (FIG. 3b). Following the processes of crossover and mutation, the fitness of the two new models may be evaluated as equation (11).

3) In certain embodiments, models may be updated to the new generation. The two new models generated in step 2 may be copied to the new generation. Each new model's fitness may be compared to the fitness of a model in the current generation selected at random uniformly and used only once. According to various embodiments, in an instance in which the new model's fitness is greater, the new model may be kept in the new generation. In other embodiments, in an instance in which the new model's fitness is less, the randomly selected model may replace the new model in the new generation with a probability $p_u$.

4) In example embodiments, steps 1, 2, and 3 may be repeated until a new generation is completed with Np models. According to certain embodiments, the fitness of the models in the new generation may be stored and used for generating of the following generation.

According to various embodiments, generations may be generated by repeating steps 1, 2, 3, and 4 until a specified number of generations are completed. Then, in some embodiments, the inversion result may be taken as the model of the final generation having the highest fitness.

In various example embodiments, the selection of a reasonable population number Np may be important. For example, selecting a large value may lead to unnecessary computations, whereas selecting a small value may lead to a local solution. In example embodiments, for problems of fewer than 30 parameters, for example, the population number of about 100 may be selected. According to various embodiments, when the population number is about 100, the model parameters may begin to localize after about 25 generations and converge toward the true values, for example, for synthetic models after about 100 generations. In these embodiments, the number of generations of about 100 may be specified for one or more inversion runs.

According to various embodiments, the probabilities of crossover $p_x$, mutation $p_m$, and update $p_u$ may be considered important parameters in the global optimization using the genetic algorithm. In an example embodiment, the values may be, for example, a low value of mutation probability (~0.01), a moderate value of crossover probability (~0.6) and a high value of update probability (~0.9).

As identified earlier, the focus of the genetic global inversion of the full waveform may be to identify the soil layering and material properties (e.g., Modulii and density) of the domain. According to various embodiments, once these properties are identified, the full waveform may be inverted over the domain knowing layering and soil properties by the Gauss-Newton method to identify anomalies.

c. Deterministic Inversion—Gauss-Newton Method

According to an example embodiment, deterministic inversion may involve minimizing a least-squared error, S(m), which measures the difference between observed data and estimated data associated with model m:

$$S(m) = \frac{1}{2}\Delta d^T \Delta d, \qquad (15)$$

where $\Delta d$ is the residual error defined as the difference between the observed and computed responses, and $\Delta d^T$ is the transpose of $\Delta d$.

$$\Delta d = \begin{bmatrix} \Delta d_1 \\ \Delta d_2 \\ \ldots \\ \Delta d_N \end{bmatrix}, \qquad (16)$$

$$\Delta d_k = g_k - d_k,$$

and $$k = 1, 2, \ldots N$$

In certain embodiments, when the initial model is substantially close to the global minimum, the Gauss-Newton method facilitates convergence to the true model. The model at the current iteration n+1 may be updated from the previous iteration n as follows:

$$m^{n+1} = m^n - [J^T J]^{-1} J^T \Delta d. \qquad (17)$$

where J is the Jacobian Matrix that may be calculated as the difference of wave fields from models with and without perturbation of individual elements. According to various embodiments, the inversion process may stop when the residual error is sufficiently small, such as below a predetermined threshold.

In some embodiments, the Gauss-Newton method may be effective and robust for numerical optimization of non-linear problems (quadratic rate) and may allow for a faster convergence rate than the gradient (linear) method. For example, according to various embodiments, all inversions may converge after 20 iterations.

II. EXAMPLE STUDIES

The following provides a summary of several example studies conducted according to various embodiments of the present invention. These studies should be considered non-limiting, illustrative examples of certain embodiments of the present invention. The first experimental study involves two layers (soil over rock) with a 2 m×2 m void within the rock layer; and the second experimental study involves three layers (two soil and one rock) with a void (3 m×3 m) in the rock with an attached chimney (3 m long×1.5 m wide) in the soil. The analyses of both experimental studies, based on embodiments of the present invention, identified the soil/rock layering properties and successfully detected the embedded anomalies, for example, sinkholes or voids that were filled with air, water, or soil.

Figure 4A:
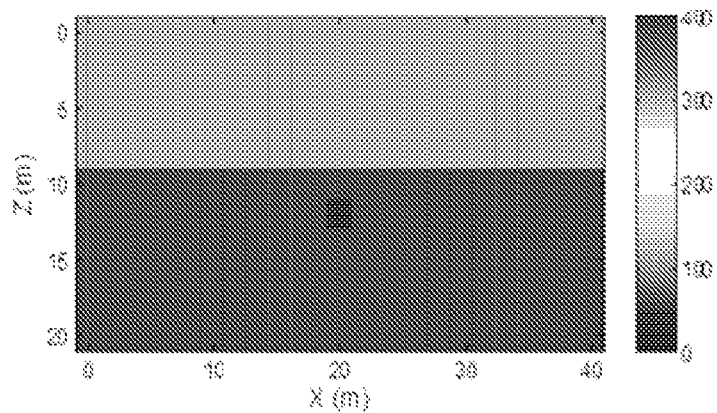
FIGS. 4a, 4b, and 4c illustrate a first model of a substrate as well as results from a global inversion and a deterministic inversion according to example embodiments of the present invention.

In the first example study, two 2-D synthetic (i.e., analytically generated) models with different sinkhole characteristics were tested. According to alternative embodiments, three-dimensional (3-D) models may also be analyzed. The examples were selected because of their difficulty with existing NDT approaches. In this first example study, the first model (FIG. 4a) consists of two soil layers with an air-filled void of 2 m×2 m (i.e., the darkest box) embedded at 12 m depth in the second layer. According to the first example study, data for the simulation used five strikes (i.e., shots) of a sledge hammer at 10 m spacing employing 21 geophones for velocity measurements at 2 m spacing on the ground surface. In the first example study, the computed synthetic data on the ground surface was used in the two stage inversion to predict the underlying conditions.

Figure 4B:
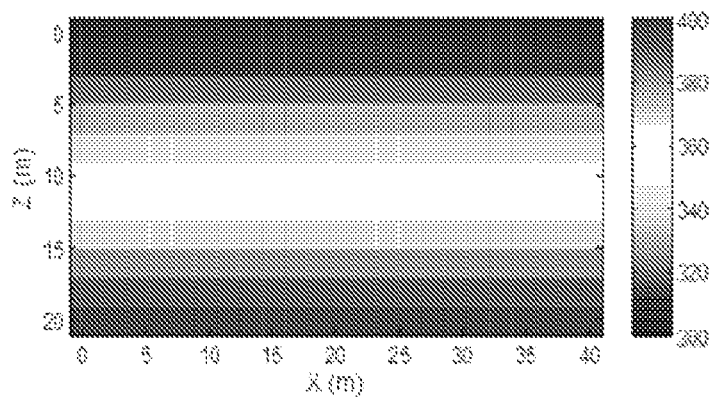
Figure 4C:
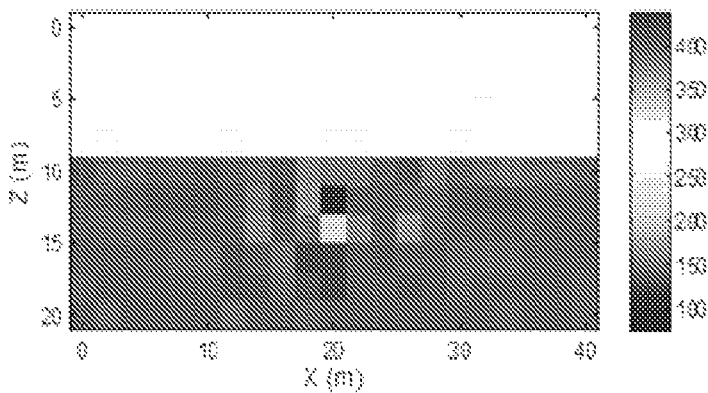

According to the first example study, the inversion process began with a global inversion, which did not require any prior information of the profile. The result from the global searching is shown in FIG. 4b, which provides general properties of the true model but no information on the existence of any voids or anomalies. In the first example study, the globally inverted model of FIG. 4b was then used as the initial model for the deterministic inversion. The prediction by the deterministic inversion is shown in FIG. 4c. From a comparison of FIGS. 4a-c, it is evident that two soil layers were accurately characterized in this first example study. Moreover, in the first example study, the presence, location, and shear velocity value (i.e., close to zero) of the sinkhole void was successfully identified. According to the first example study, absolutely no soil information (e.g., boring, etc.) was needed, only the measured surface wave information (i.e., velocities from the geophones) from the hammer strikes was recorded and used.

Figure 5A:
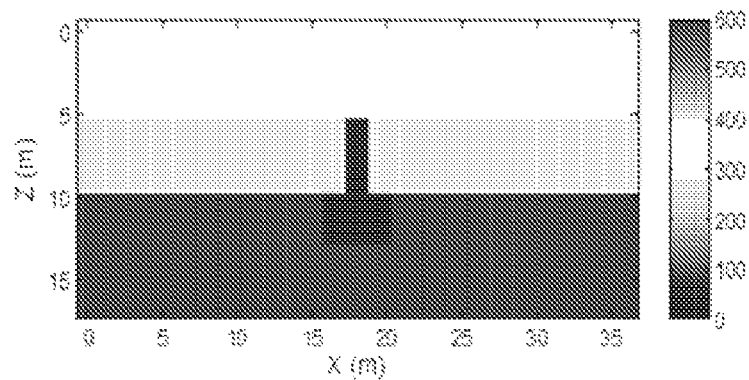
FIGS. 5a, 5b, and 5c illustrate a second model of a substrate as well as results from a global inversion and a deterministic inversion according to example embodiments of the present invention.

According to a second example study, a second synthetic model (FIG. 5a) consisting of three layers with an embedded water-filled sinkhole (i.e., the darkest zone) consisting of a cavity (3 m×4.5 m) and a chimney (1.5 m width) was tested. The second example study mimics a real soil profile at Newberry, Fla. which consists of two upper layers of approximately 10 m of medium-dense, fine, silty sand underlain by limestone. According to the second example study, the materials' shear wave velocities were 300 m/s and 400 m/s for the soils, 600 m/s for Limestone, and zero for the sinkhole.

Figure 6:
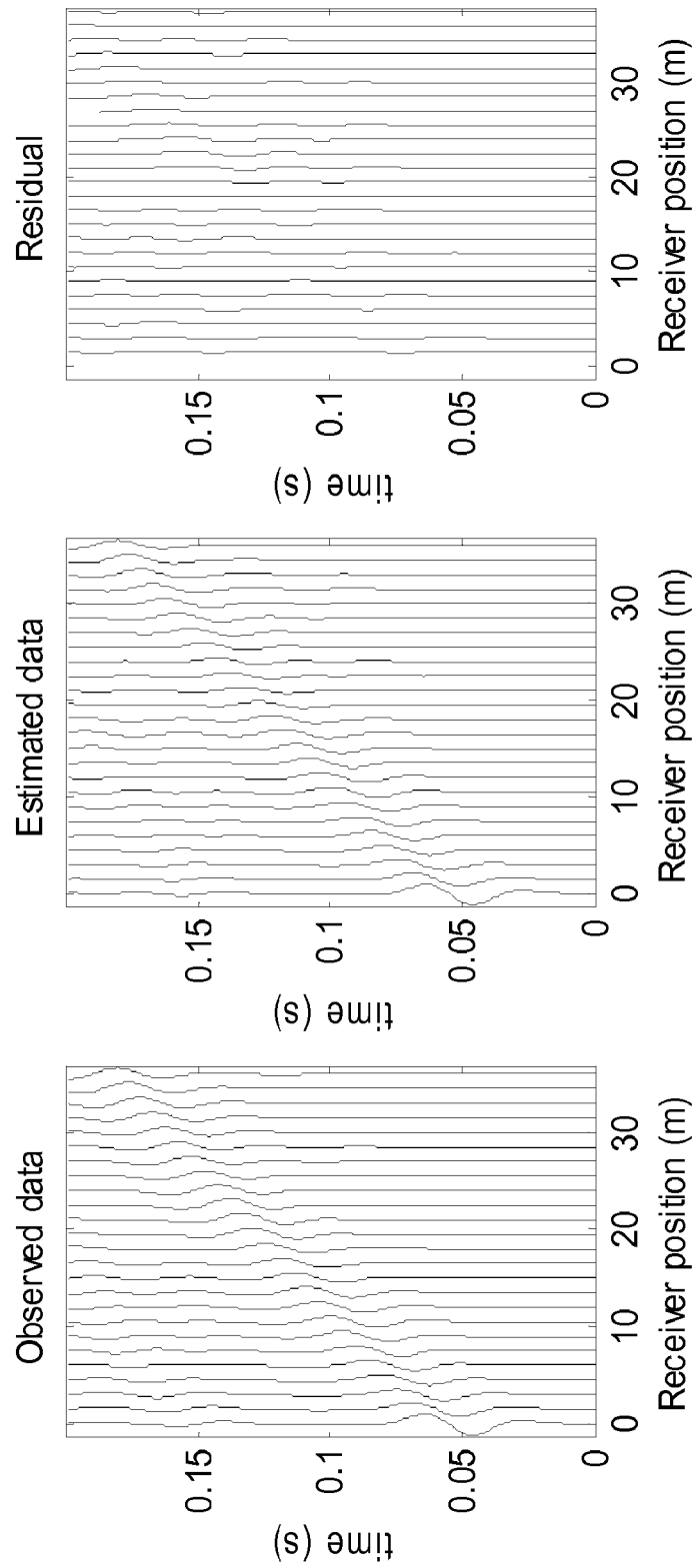
FIG. 6 illustrates a comparison between observed and estimated data related to the second model according to example embodiments of the present invention.

Similar to the first example study, in the second example study, a synthetic surface data set was generated using nine hammer strikes of a sledge hammer at 4.5 m spacing with velocities recorded from 25 geophones at 1.5 m spacing on the ground surface. Again, in the second example study, the genetic global inversion was performed and the results of the global inversion were used during the performance of the deterministic inversion. According to the second example study, in order to invert the complex geometry and identify the sinkhole, both inversions took several hours on a standard computer. In the second example study, convergence was established when the predicted surface response was close to the input data (FIG. 6).

Figure 5B:
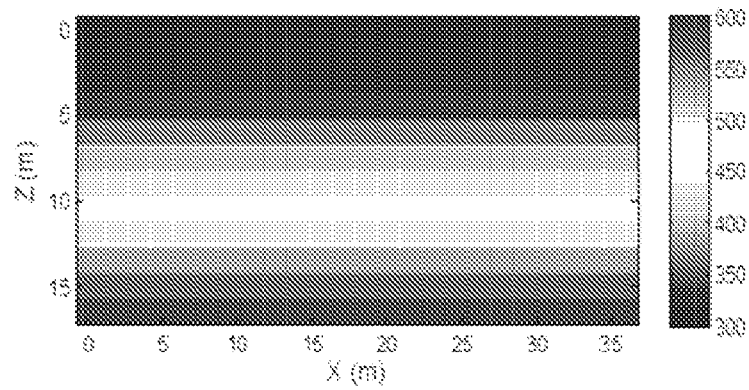
Figure 5C:
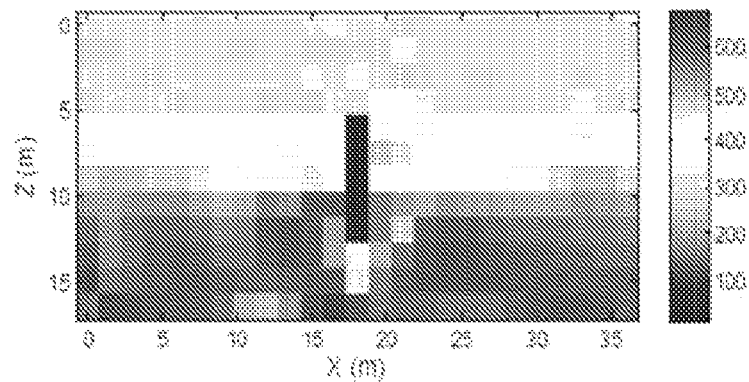

The results from global and deterministic inversions of the second example study are shown in FIGS. 5b and 5c, respectively. Again, the result from the global searching (FIG. 5b) in the second example study provides general properties of the true model but no information of the void is available. Furthermore, the results from deterministic searching (FIG. 5c) according to the second example study provide information of the true model in detail. As is evident from the results of the second example study, as shown in FIG. 5c, three soil/rock layers were inverted and the sinkhole (void and chimney) was identified.

III. CONCLUSION

Various advantageous embodiments of the present invention describe the use of inversion of full seismic wave equations to obtain site characterization of soil/rock layering and anomalies beneath structures. According to advantageous embodiments, seismic particle motions on the ground surface may be observed to assess the soil layering, properties (e.g., Modulii), and anomalies beneath the ground surface. The inversion process of advantageous embodiments may begin with a global genetic algorithm to obtain the general information of soil/rock properties (e.g., shear and compression wave velocities and density) of the domain (e.g., layering). In certain advantageous embodiments, the global inversion technique may be independent of an initial model. Accordingly, various advantageous embodiments of the present invention become important in regions where prior information about subsurface profiles is not available. According to various advantageous embodiments, a deterministic inversion, for example the Gauss-Newton method, may be performed on the global inversion results to provide detailed information of the medium (e.g., anomalies, sinkholes, or voids).

As shown in various non-limiting, example studies, advantageous embodiments of the present invention have successfully been used to characterize embedded voids that may be filled with air, water, or soil. Certain advantageous embodiments may be used to identify not only geological anomalies but manmade anomalies. For example, the identification of unknown foundations may be possible according to example advantageous embodiments. Advantageous example embodiments of the present invention may be used to identify types of foundations (e.g., shallow vs. deep foundations) and their layouts (e.g., number of piles and their lengths) in instances in which information on existing infrastructure foundations has been lost. Such embodiments may advantageously be significantly cheaper than using borings (i.e., surface monitoring). The information provided by the various advantageous embodiments may be used for future renovation, upgrades, etc.

Many modifications and other embodiments of the inventions set forth herein will come to mind to one skilled in the art to which these inventions pertain having the benefit of the teachings presented in the foregoing descriptions. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for detecting subterranean properties associated with a geological domain comprising:
   obtaining waveform information corresponding to a geological domain through the use of (a) at least one impact mechanism configured to generate one or more impacts on the surface of the geological domain and (b) at least one receiver configured to record waveform information related to one or more seismic wave fields created by generating the one or more impacts;
   determining, by at least one processor, a layering geometry of the geological domain by performing a global inversion on the waveform information, wherein performing the global inversion comprises assuming a free-surface condition for the surface of the geological domain;
   performing a deterministic inversion on the waveform information based on the determined layering geometry of the geological domain; and
   determining one or more subterranean properties associated with the geological domain based at least in part on the global inversion and the deterministic inversion.

2. The method of claim 1, wherein an output of the global inversion is provided as an input to the deterministic inversion.

3. The method of claim 1, wherein the global inversion comprises a genetic inversion.

4. The method of claim 3, wherein the deterministic inversion comprises a Gauss-Newton deterministic inversion.

5. The method of claim 1, wherein performing a deterministic inversion further comprises:
dividing the geological domain into a plurality of cells;
modifying one or more properties associated with one or more of the plurality of cells independently;
predicting waveform information based at least in part on the modified one or more properties of the plurality of cells; and
performing a deterministic inversion of the waveform information for the geological domain to reduce the error between the obtained waveform information and the predicted waveform information.

6. The method of claim 5, wherein the one or more properties comprise one or more of density and modulii.

7. The method of claim 1, wherein the waveform information comprises a full seismic wave field.

8. The method of claim 7, wherein the full seismic wave field comprises one or more of compression waves, shear waves, and surface waves.

9. The method of claim 1, wherein performing a global inversion further comprises:
determining material properties of the geological domain.

10. The method of claim 1, wherein the geological domain is represented in two-dimensional space.

11. The method of claim 1, wherein obtaining waveform information corresponding to a geological domain further comprises:
subjecting a ground surface of the geological domain to one or more impacts; and
recording waveform information resulting from the one or more impacts.

12. The method of claim 11, wherein the one or more impacts are created by striking the ground surface with an impact mechanism.

13. The method of claim 11, wherein recording waveform information comprises recording waveform information using one or more receivers.

14. The method of claim 11, wherein recording waveform information resulting from the one or more impacts comprises recording one or more wave velocities at multiple locations on the ground surface from one or more waveforms resulting from the one or more impacts.

15. The method of claim 11, wherein a plurality of impacts are applied at a plurality of respective locations along the ground surface.

16. The method of claim 1, wherein the global inversion does not use an initial model of the geological domain.

17. The method of claim 1, wherein performing a global inversion further comprises:
generating a first generation of models comprising one or more random models represented by one or more model parameters;
determining the fitness between data generated by the global inversion and expected data associated with each of the one or more random models;
generating a second generation of models based at least in part on the first generation, wherein the second generation is generated by a reproduction comprising one or more of selection, crossover, and mutation.

18. The method of claim 17, wherein one or more subsequent generations may be generated iteratively based at least in part on the previous generation.

19. The method of claim 1, wherein determining one or more subterranean properties comprises determining at least one of anomalies or sinkholes associated with the geological domain.

20. A system for detecting subterranean properties associated with a geological domain, the system comprising:
at least one impact mechanism configured to generate one or more impacts on the surface of the geological domain;
at least one receiver configured to record waveform data related to one or more seismic wave fields created by generating the one or more impacts; and
a processor in communication with the at least one receiver configured to:
perform a global inversion based at least in part on the waveform data, wherein performing the global inversion comprises assuming a free-surface condition for the surface of the geological domain;
generate a globally inverted model from the global inversion to identify a layering geometry of the geological domain and material properties of the geological domain;
perform a deterministic inversion on the waveform data based at least in part on the layering geometry; and
identify one or more voids or anomalies in the geological domain based at least in part on an output of the deterministic inversion.

* * * * *